Patented Dec. 4, 1945

2,390,450

UNITED STATES PATENT OFFICE 2,390,450

LITHIUM BASE GREASES

John D. Morgan, South Orange, N. J., assignor to Cities Service Oil Company, New York, N. Y., a corporation of Pennsylvania No Drawing. Application January 22, 1942, Serial No. 427,724

10 Claims. (Cl. 252—36)

This invention relates to improvements in lithium base lubricants, and more particularly to greases adapted for use at extremely low temperatures and containing lithium soaps.

In the manufacture of lubricating greases, consideration is almost invariably given to at least the general purpose for which the grease is to be used. Some greases are made for specific types of bearings or conditions, but so far as known, very little has been done toward the development of greases adapted for use over temperatures ranging from above normal to extremely low temperatures. A very pressing problem in this connection is the provision of greases for use in aircraft where the grease should be stable and plastic at temperatures ranging from possibly 180° F. to temperatures as low as minus 60° to minus 70° F. Ordinary greases are stable at the higher temperatures, but at low temperatures even around zero degrees Fahrenheit many greases become hard and stiff, and not only fail to lubricate, but make operation of the equipment extremely difficult.

Lithium soaps have been found to give greases which are stable and plastic over the wide temperature ranges referred to above. Greases made from lithium soaps are especially adapted for lubricating various bearings of aircraft in which a grease must be used instead of liquid lubricants. Greases made from sodium and potassium soaps are well-known, but they do not have the property of being stable and plastic over the temperature ranges indicated. While many broad proposals have been made for using "alkali metal" soaps in greases (and lithium is an alkali metal), the use of lithium soaps in greases, in the proportions given below, is believed to be new. Likewise, the property of specific proportions of lithium soaps to impart stability and plasticity to greases over wide ranges of temperatures, including relatively low sub-zero temperatures is believed to be an important discovery in connection with the present invention.

The features of the invention may be illustrated by reference to the following examples of grease compositions containing lithium soaps in which the quantities of the various materials are given in parts by weight, except as indicated.

Example No. 1

A light grease useful at extremely low temperatures was prepared by heating about 95 parts of mixed base lubricating oil stock, having a Saybolt viscosity at 100° F. of 72 seconds, to a temperature of about 300° F., and then adding about 5 parts of lithium stearate and 1.5 parts of aluminum stearate. These soaps were thoroughly mixed with the oil and the heating continued until a temperature of about 450° F. was attained. If desired from 0.1 to 1% of an antioxidant compound, and from 0.5 to 1% of a pour point depressant may be added to the mixture at this time. After the desired proportions of these materials were added to the mixture, the heating was discontinued and thte final mixture quickly cooled in thin layers down to normal room temperature.

The resulting product had a lower utilization point of minus 65° F. and showed the following properties:

Worked penetration A. S. T. M_____ 320
Dropping point A. S. T. M_____° F__ 365
Separation, 50 hours at 150° F____percent__ 0.5

Example No. 2

A light grease was also made by the procedure outlined in Example No. 1, by heating about 95 parts of a naphthenic base lubricating oil stock, having a Saybolt Universal viscosity at 100° F. of 200 seconds, and adding 5 parts of lithium stearate, about 1 part of aluminum stearate and about one part of rubber latex. The temperatures employed, and cooling, was substantially the same as in Example No. 1, and the resulting grease showed the following properties:

Worked penetration A. S. T. M_____ 312–326
Dropping point A. S. T. M_____° F__ 386
Separation, 50 hours at 150° F_____ None The use of rubber latex or its equivalent improves the colloidal dispersion of the constituents, and the stability and smoothness of the grease, and decreases or prevents bleeding.

Example No. 3

A medium grease was prepared by using 93 parts of the same lubricating oil stock as in Example No. 2, and mixing therewith about 7 parts of lithium stearate and 1.5 parts of aluminum stearate. The resulting grease showed the following properties:

Worked penetration A. S. T. M_____ 282
Dropping point A. S. T. M_____° F__ 386
Separation, 50 hours at 150° F_____ None

Example No. 4

A relatively thick grease was prepared by using about 89 parts of the lubricating oil stock used in Example No. 2, together with about 11 parts of lithium stearate and 1.5 parts of aluminum stearate. The resulting grease had the following properties:

Worked penetration A. S. T. M._____ 244
Dropping point A. S. T. M._____° F.__ 395
Separation, 50 hours at 150° F._____ None The grease compositions of Examples Nos. 2, 3 and 4 may include, and preferably do include, an anti-oxidant and a pour point depressant, as in the case of the grease of Example No. 1. Any of the various commercial anti-oxidants or anti-corrosion agents may be used, such for example as tributyl phosphite and other organic phosphorus compounds. Triphenyl and tricresyl phosphites may be used. Many anti-oxidants act as corrosion inhibitors or prevent the catalytic activity of metals. Any of the other known anti-oxidants may be employed. The condensation product of chlorinated wax and naphthalene, "Paraflow," has been found satisfactory as a pour point depressant, but the invention is not restricted to the use of this particular material, since other pour point depressants may be used. The proportions of anti-oxidant and pour point depressant are usually very small, and under usual conditions need not be greater than the limits mentioned in Example No. 1, which are given in percentages by weight based on the weight of the mixture of oil stock and soap ingredients.

The oil stocks used for making various grades of grease in accordance with the present invention may vary in viscosity from about 70 to 200 seconds and higher, and the oils are preferably of mixed base or naphthenic base type, such as Mid-Continent and California lubricating oil stocks. A very satisfactory grease has been made from steam cylinder stock, using 95 parts of such stock to five parts of lithium stearate, two parts of aluminum stearate, and two parts of rubber latex. In this composition, the proportion of lithium stearate may be varied from about four to about twelve parts, with a corresponding change in the proportion of cylinder stock. The lubricating oil stocks used preferably have a low pour point of at least about zero degrees Fahrenheit. Very satisfactory results were obtained with stocks of zero degrees Fahrenheit pour point.

While lithium stearate is the preferred lithium soap, it is to be understood that the lithium salts of other fatty acids of high mol weight may be used, preferably the salts of unsaturated fatty acids. The proportion of lithium soap in the grease may vary from about four to about twelve parts by weight to from ninety-six to about eighty-eight parts by weight of lubricating oil stock. The commercial stearic acid used for making the lithium stearate in one instance contained as much as 25% of palmitic acid so that a mixture of salts resulted which gave very satisfactory grease products. In general, it is preferred to make the lithium soaps directly from relatively pure or commercial fatty acids, using either lithium carbonate or lithium hydroxide of at least about 95% purity for making the salts. However, a lithium soap of castor oil has been found satisfactory. Various known fatty acids may be used such as lauric, myristic, linoleic, petroleum acids, or fatty acids made from mineral oils, as for example by oxidation. Lithium naphthenates however are preferably used in addition to a lithium soap because of their greater solubility in the lubricating oil stock and their tendency to stabilize the dispersions of soaps and other ingredients in the oil stock. The proportion of the lithium naphthenate used should in general be less than the proportion of soap and may vary from about 0.1% to about 1.5% of the mixture.

The proportion of aluminum soap employed in the grease may vary from about 0.5% to about 3% of the mixture and is preferably a relatively pure product. While aluminum stearate is preferred, the aluminum derivatives of other fatty acids such as oleic, palmitic, myristic, acids made from mineral oils and others may be used. The primary functions of the aluminum soap is to prevent or greatly reduce the bleeding of the grease and to increase the colloidal dispersion of the other ingredients of the mixture.

Any of the greases made in accordance with the present invention may include from 0.5% to about 2.5% by weight of rubber latex or its equivalent. In most cases about 1% of latex is sufficient and is preferably used in making some of the lighter greases. Natural or synthetic rubber may be used in place of latex, such as balata, gum rubber, chlorinated rubber, butyl rubber and other elastic organic compounds any of which is included under the general term "rubber" as used herein.

The proportions of the various ingredients may be varied as illustrated by the examples, to provide a grease of desired penetration and dropping point which will be suitable for the particular bearings used and the low temperatures to be encountered. The penetration may vary from about 350 to about 220 and the dropping point from about 345° to 415° F.

It is to be understood that although the features of the invention have been described and illustrated in connection with certain examples, the invention is not restricted, except by the prior art and the scope of the appended claims.

Having thus described the features of the invention and illustrated the same with a number of specific examples, what is claimed as new is:

1. A lubricating composition comprised principally of a lubricating oil, from about 4% to about 12% by weight of a lithium soap, from about 0.5 to 3% by weight of an aluminum soap, and from about 0.5 to 2.5% by weight of a rubber as an agent for preventing the bleeding of the grease composition.

2. A lubricating grease comprised mainly of lubricating oil, from 4 to 12 per cent by weight of lithium stearate, from 0.5% to 2.5% of a rubber, and from 0.5 to 3 by weight of aluminum stearate for increasing the colloidal dispension of the lithium stearate therein.

3. A lubricating grease composition comprised essentially of from about four to six parts by weight of a lithium soap, from about 0.5 to 1.0 part by weight of an aluminum soap for increasing the colloidal dispersion of the other constituents of the grease, from about 0.5 to 2.5 parts by weight of a rubber, and from about ninety-four to ninety-six parts by weight of a lubricating oil.

4. A lubricating grease composition comprised essentially of from about four to six parts by weight of lithium stearate, from about 0.5 to one part by weight of aluminum stearate for increasing the colloidal dispersion of the other constituents of the grease, about one part by weight of latex, and from ninety four to ninety six parts by weight of a lubricating oil.

5. A lubricating grease comprised mainly of a lubricating oil, from 10% to 12% by weight of lithium stearate, about 1% by weight of a rubber, and from 2% to 3% by weight of an aluminum soap for increasing the colloidal dispersion of the lithium stearate in the oil and for reducing the bleeding of the grease.

6. A lubricating grease composition useable at temperatures of from minus 60° to minus 70° F. comprised mainly of a lubricating oil, from 4% to 12% by weight of a lithium soap, and from 0.1% to 1.5% by weight of lithium naphthenate as a stabilizing agent for the mineral oil and lithium soap.

7. A lubricant comprised principally of a lubricating oil and containing from about 4% to about 12% by weight of a lithium soap of castor oil and a relatively small but sufficient proportion of lithium naphthenate as a stabilizer for the oil and soap.

8. A lubricating composition comprised principally of a lubricating oil, from about 4% to about 12% by weight of a lithium soap, from about 0.5% to 2.5% by weight of a rubber, and a relatively small but sufficient proportion of a lithium naphthenate as a solubilizing and stabilizing agent.

9. A lubricating grease comprised mainly of a lubricating oil, from 4% to 12% by weight of a lithium soap, from 0.5% to 3% by weight of an aluminum soap, and from 0.1% to 1.5% by weight of a lithium naphthenate as a stabilizing agent for the mineral oil and soaps.

10. A lubricating grease comprised mainly of a lubricating oil, from 4% to 12% by weight of a lithium soap, from 0.5% to 2.5% of a rubber, and from 0.1% to 1.5% by weight of a lithium naphthenate as a stabilizing agent for the grease.

JOHN D. MORGAN.